US008707011B1

(12) United States Patent
Glasco et al.

(10) Patent No.: US 8,707,011 B1
(45) Date of Patent: Apr. 22, 2014

(54) MEMORY ACCESS TECHNIQUES UTILIZING A SET-ASSOCIATIVE TRANSLATION LOOKASIDE BUFFER

(75) Inventors: David B. Glasco, Austin, TX (US); Lingfeng Yuan, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 497 days.

(21) Appl. No.: 11/588,177

(22) Filed: Oct. 24, 2006

(51) Int. Cl.
*G06F 12/00* (2006.01)
*G06F 13/00* (2006.01)
*G06F 13/28* (2006.01)

(52) U.S. Cl.
USPC ........... 711/207; 711/292; 711/205; 711/206; 711/118

(58) Field of Classification Search
USPC .......................... 711/206, 202, 205, 118, 207
See application file for complete search history.

(56) References Cited

U.S. PATENT DOCUMENTS

| | | | |
|---|---|---|---|
| 3,815,101 A | 6/1974 | Boss et al. | |
| 3,950,729 A | 4/1976 | Fletcher et al. | |
| 4,654,790 A | 3/1987 | Woffinden | |
| 4,797,814 A | 1/1989 | Brenza | |
| 4,812,981 A | 3/1989 | Chan et al. | |
| 5,123,094 A | 6/1992 | MacDougall | |
| 5,179,669 A | 1/1993 | Peters | |
| 5,245,702 A | 9/1993 | McIntyre et al. | |
| 5,278,962 A | 1/1994 | Masuda et al. | |
| 5,414,824 A | 5/1995 | Grochowski | |
| 5,446,854 A * | 8/1995 | Khalidi et al. ................. 711/1 |
| 5,526,504 A * | 6/1996 | Hsu et al. ..................... 711/207 |
| 5,649,102 A | 7/1997 | Yamauchi et al. | |
| 5,649,184 A | 7/1997 | Hayashi et al. | |
| 5,696,925 A | 12/1997 | Koh | |
| 5,949,785 A | 9/1999 | Beasley | |
| 5,963,984 A | 10/1999 | Garibay, Jr. et al. | |
| 5,999,189 A | 12/1999 | Kajiya et al. | |
| 6,012,132 A * | 1/2000 | Yamada et al. ............... 711/207 |

(Continued)

FOREIGN PATENT DOCUMENTS

| | | |
|---|---|---|
| JP | 02288927 | 11/1990 |
| JP | 0305466 | 1/1991 |
| JP | 03054660 | 3/1991 |
| JP | 04182858 | 6/1992 |

OTHER PUBLICATIONS

Harper et al., (Rapid recovery from transient Faults in the fault tolerant processor with fault-tolerant shared memory) 1990, IEEE, p. 350-359.
PCMAG (Definition of: Page fault) PCMag, 1.

(Continued)

*Primary Examiner* — Stephen Elmore
*Assistant Examiner* — Mark Giardino, Jr.

(57) ABSTRACT

A memory access technique, in accordance with one embodiment of the present invention, includes caching page size data for use in accessing a set-associative translation lookaside buffer (TLB). The technique utilizes a translation lookaside buffer data structure that includes a page size table and a translation lookaside buffer. Upon receipt of a memory access request a page size is looked-up in the page size table utilizing the page directory index in the virtual address. A set index is calculated utilizing the page size. A given set of entries is then looked-up in the translation lookaside buffer utilizing the set index. The virtual address is compared to each TLB entry in the given set. If the comparison results in a TLB hit, the physical address is received from the matching TLB entry.

11 Claims, 6 Drawing Sheets

(56) References Cited

U.S. PATENT DOCUMENTS

| | | | |
|---|---|---|---|
| 6,297,832 | B1 | 10/2001 | Mizuyabu et al. |
| 6,298,390 | B1 | 10/2001 | Matena et al. |
| 6,362,826 | B1 | 3/2002 | Doyle et al. |
| 6,457,115 | B1 | 9/2002 | McGrath |
| 6,470,428 | B1 | 10/2002 | Milway et al. |
| 6,499,090 | B1 | 12/2002 | Hill et al. |
| 6,549,997 | B2 | 4/2003 | Kalyanasundharam |
| 6,636,223 | B1 | 10/2003 | Morein |
| 6,658,538 | B2 | 12/2003 | Arimilli et al. |
| 6,742,104 | B2 | 5/2004 | Chauvel et al. |
| 6,813,699 | B1 | 11/2004 | Belgard |
| 6,823,433 | B1 | 11/2004 | Barnes et al. |
| 6,839,813 | B2 | 1/2005 | Chauvel |
| 6,859,208 | B1 | 2/2005 | White |
| 6,877,077 | B2 | 4/2005 | McGee et al. |
| 6,883,079 | B1 | 4/2005 | Priborsky |
| 7,007,075 | B1 | 2/2006 | Coffey |
| 7,082,508 | B2 | 7/2006 | Khan et al. |
| 7,107,411 | B2 | 9/2006 | Burton et al. |
| 7,107,441 | B2 | 9/2006 | Zimmer et al. |
| 7,120,715 | B2 | 10/2006 | Chauvel et al. |
| 7,159,095 | B2 * | 1/2007 | Dale et al. ............ 711/200 |
| 7,194,597 | B2 | 3/2007 | Willis et al. |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 | 4/2009 | Wilt |
| 7,545,382 | B1 | 6/2009 | Montrym et al. |
| 7,730,489 | B1 | 6/2010 | Duvur et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 * | 10/2003 | Mathews ............ 711/207 |
| 2003/0236771 | A1 | 12/2003 | Becker |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1 | 10/2004 | Jacobs et al. |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 | 3/2006 | Inoue et al. |
| 2006/0069899 | A1 | 3/2006 | Schoinas et al. |
| 2006/0187945 | A1 | 8/2006 | Andersen |
| 2006/0195683 | A1 | 8/2006 | Kissell |
| 2006/0230223 | A1 | 10/2006 | Kruger et al. |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 | 6/2007 | Glasco et al. |
| 2007/0157001 | A1 | 7/2007 | Ritzau |
| 2007/0168634 | A1 | 7/2007 | Morishita et al. |
| 2007/0168643 | A1 | 7/2007 | Hummel et al. |
| 2008/0263284 | A1 | 10/2008 | da Silva et al. |

OTHER PUBLICATIONS

Wikipedia, (Page Fault definition), Wikipedia, Mar. 9, 2009, pp. 1-4.
Wikipedia, (CPU Cache definition), Wikipedia, Jan. 26, 2010, pp. 1-16.
Osronline, (The Basics: So what is a Page fault?), http://www.osronline.com/article.cfm?article=222, May 5, 2003, p. 1-2.
Chaudhuri, "The impact of NACKs in shared memory scientific applications", Feb. 2004, IEEE, IEEE Transactions on Parallel and distributed systems vol. 15, No. 2, p. 134-150.
Laibinis, "Formal Development of Reactive Fault Tolerant Systems", Sep. 9, 2005, Springer, Second International Workshop, RISE 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Guelfi et al., (Rapid Integration of Software Engineering Techniques) 2005, Second International Workshop, 9 pages.
Glasco et al.; Notice of Allowance Dated Mar. 17, 2011; U.S. Appl. No. 11/592,076; filed Nov. 1, 2006.
Glasco et al.; Notice of Allowance Dated Jun. 29, 2011; U.S. Appl. No. 11/592,076; filed Nov. 1, 2006.
Glasco et al.; Notice of Allowance Dated Oct. 14, 2011; U.S. Appl. No. 11/592,076; filed Nov. 1, 2006.
Glasco et al.; Notice of Allowance Dated Jan. 27, 2012; U.S. Appl. No. 11/592,076; filed Nov. 1, 2006.
Glasco et al.; Notice of Allowance Dated May 10, 2012; U.S. Appl. No. 11/592,076; filed Nov. 1, 2006.
Glasco et al.; Office Action Dated Feb. 1, 2011; U.S. Appl. No. 12/650,068; filed Dec. 30, 2009.
Glasco et al.; Office Action Dated Aug. 9, 2011; U.S. Appl. No. 12/650,068; filed Dec. 30, 2009.
Glasco et al.; Office Action Dated Nov. 16, 2011; U.S. Appl. No. 12/650,068; filed Dec. 30, 2009.
Glasco et al.; Notice of Allowance Dated May 1, 2012; U.S. Appl. No. 12/650,068; filed Dec. 30, 2009.
Glasco et al.; Notice of Allowance Dated Jul. 6, 2012; U.S. Appl. No. 12/650,068; filed Dec. 30, 2009.
Notice of Allowance Dated Jul. 21, 2011; U.S. Appl. No. 11/523,830.
Notice of Allowance Dated Oct. 26, 2011; U.S. Appl. No. 11/523,830.
Notice of Allowance Dated Feb. 2, 2012; U.S. Appl. No. 11/523,830.
Notice of Allowance Dated May 10, 2012; U.S. Appl. No. 11/523,830.
Notice of Allowance Dated Aug. 25, 2011; U.S. Appl. No. 11/586,756.
Notice of Allowance Dated Jan. 13, 2012; U.S. Appl. No. 11/586,756.
Notice of Allowance Dated May 15, 2012; U.S. Appl. No. 11/586,756.
Final Office Action Dated May 4, 2010; U.S. Appl. No. 11/591,857.
Notice of Allowance Dated Jul. 21, 2011; U.S. Appl. No. 11/591,857.
Notice of Allowance Dated Oct. 28, 2011; U.S. Appl. No. 11/591,857.
Notice of Allowance Dated Feb. 10, 2012; U.S. Appl. No. 11/591,857.
Notice of Allowance Dated May 25, 2012; U.S. Appl. No. 11/591,857.
Notice of Allowance Dated Sep. 18, 2012; U.S. Appl. No. 11/591,857.
Final Office Action Dated Jul. 5, 2011; U.S. Appl. No. 11/592,106.
Final Office Action Dated Dec. 2, 2011; U.S. Appl. No. 11/592,106.
Final Office Action Dated May 10, 2012; U.S. Appl. No. 111592,106.
Notice of Allowance Dated Feb. 3, 2011; U.S. Appl. No. 11/523,926.
Notice of Allowance Dated May 23, 2011; U.S. Appl. No. 11/523,926.
Notice of Allowance Dated Aug. 23, 2011; U.S. Appl. No. 11/523,926.
Notice of Allowance Dated Oct. 28, 2011; U.S. Appl. No. 11/523,926.
Notice of Allowance Dated Feb. 24, 2012; U.S. Appl. No. 11/523,926.
Notice of Allowance Dated Jun. 1, 2012; U.S. Appl. No. 11/523,926.
Notice of Allowance Dated Sep. 12, 2012; U.S. Appl. No. 11/523,926.
Notice of Allowance Dated Jun. 9, 2011; U.S. Appl. No. 11/523,950.
Notice of Allowance Dated Aug. 30, 2011; U.S. Appl. No. 11/523,950.
Notice of Allowance Dated Nov. 14, 2011; U.S. Appl. No. 11/523,950.

(56) References Cited

OTHER PUBLICATIONS

Notice of Allowance Dated Feb. 16, 2011; U.S. Appl. No. 11/586,826.
Notice of Allowance Dated Jul. 26, 2011; U.S. Appl. No. 11/586,826.
Notice of Allowance Dated Dec. 27, 2011; U.S. Appl. No. 11/586,826.
Notice of Allowance Dated Jul. 5, 2012; U.S. Appl. No. 11/586,826.
Notice of Allowance Dated Apr. 19, 2011; U.S. Appl. No. 11/592,819.
Notice of Allowance Dated Sep. 7, 2011; U.S. Appl. No. 11/592,819.
Notice of Allowance Dated Dec. 8, 2011; U.S. Appl. No. 11/586,825.
Notice of Allowance Dated Dec. 9, 2011; U.S. Appl. No. 11/592,819.
Notice of Allowance Dated Jun. 7, 2012; U.S. Appl. No. 11/592,819.
Notice of Allowance Dated Oct. 5, 2012; U.S. Appl. No. 11/592,819.
Office Action Dated Sep. 14, 2012; U.S. Appl. No. 11/591,629.
Final Office Action Dated Apr. 12, 2011; U.S. Appl. No. 11/592,780.
Office Action Dated Nov. 1, 2011; U.S. Appl. No. 11/592,780.
Final Office Action Dated May 7, 2012; U.S. Appl. No. 11/592,780.
Notice of Allowance Dated Jun. 17, 2011; U.S. Appl. No. 11/591,856.
Notice of Allowance Dated Sep. 26, 2011; U.S. Appl. No. 11/591,856.
Notice of Allowance Dated Jan. 5, 2012; U.S. Appl. No. 11/591,856.
Notice of Allowance Dated Apr. 12, 2012; U.S. Appl. No. 11/591,856.
Notice of Allowance Dated Jun. 7, 2012; U.S. Appl. No. 11/591,856.
Notice of Allowance Dated Sep. 17, 2012; U.S. Appl. No. 11/591,856.
Notice of Allowance Dated Jun. 16, 2011; U.S. Appl. No. 11/586,825.
Notice of Allowance Dated Aug. 9, 2011; U.S. Appl. No. 11/586,825.
Notice of Allowance Dated Jul. 6, 2012; U.S. Appl. No. 11/586,825.
Notice of Allowance Dated Oct. 12, 2012; U.S. Appl. No. 11/586,825.
Office Action Dated May 6, 2011; U.S. Appl. No. 11/591,685.
Final Office Action Dated Nov. 16, 2011; U.S. Appl. No. 11/591,685.
Notice of Allowance Dated Feb. 22, 2012; U.S. Appl. No. 11/591,685.
Notice of Allowance Dated May 30, 2012; U.S. Appl. No. 11/591,685.
Notice of Allowance Dated Sep. 26, 2012; U.S. Appl. No. 11/591,685.
Notice of Allowance Dated Aug. 29, 2012; U.S. Appl. No. 11/523,830.
Notice of Allowance Dated Nov. 20, 2012; U.S. Appl. No. 11/588,177.
Notice of Allowance Dated Mar. 21, 2012; U.S. Appl. No. 11/586,825.
Glasco et al., Notice of Allowance Dated Jul. 21, 2011; U.S. Appl. No. 11/523,830.
Glasco et al., Notice of Allowance Dated Oct. 26, 2011; U.S. Appl. No. 11/523,830.
Glasco et al., Notice of Allowance Dated Feb. 2, 2012; U.S. Appl. No. 11/523,830.
Glasco et al., Notice of Allowance Dated May 10, 2012; U.S. Appl. No. 11/523,830.
Glasco et al., Notice of Allowance Dated Aug. 25, 2011; U.S. Appl. No. 11/586,756.
Glasco et al., Notice of Allowance Dated Jan. 13, 2012; U.S. Appl. No. 11/586,756.
Glasco et al., Notice of Allowance Dated May 15, 2012; U.S. Appl. No. 11/586,756.
Glasco et al., Final Office Action Dated May 4, 2010; U.S. Appl. No. 11/591,857.
Glasco et al., Notice of Allowance Dated Jul. 21, 2011; U.S. Appl. No. 11/591,857.
Glasco et al., Notice of Allowance Dated Oct. 28, 2011; U.S. Appl. No. 11/591,857.
Glasco et al., Notice of Allowance Dated Feb. 10, 2012; U.S. Appl. No. 11/591,857.
Glasco et al., Notice of Allowance Dated May 25, 2012: U.S. Appl. No. 11/591,857.
Glasco et al., Notice of Allowance Dated Sep. 18, 2012: U.S. Appl. No. 11/591,857.
Glasco et al., Final Office Action Dated Jul. 5, 2011; U.S. Appl. No. 11/592,106.
Glasco et al., Final Office Action Dated Dec. 2, 2011; U.S. Appl. No. 11/592,106.
Glasco et al., Final Office Action Dated May 10, 2012; U.S. Appl. No. 11/592,106.
Glasco et al., Notice of Allowance Dated Feb. 3, 2011; U.S. Appl. No. 11/523,926.
Glasco et al., Notice of Allowance Dated May 23, 2011; U.S. Appl. No. 11/523,926.
Glasco et al., Notice of Allowance Dated Aug. 23, 2011; U.S. Appl. No. 11/523,926.
Glasco et al., Notice of Allowance Dated Oct. 28, 2011; U.S. Appl. No. 11/523,926.
Glasco et al., Notice of Allowance Dated Feb. 24, 2012: U.S. Appl. No. 11/523,926.
Glasco et al., Notice of Allowance Dated Jun. 1, 2012: U.S. Appl. No. 11/523,926.
Glasco et al., Notice of Allowance Dated Sep. 12, 2012: U.S. Appl. No. 11/523,926.
Glasco et al., Notice of Allowance Dated Jun. 9, 2011; U.S. Appl. No. 11/523,950.
Glasco et al., Notice of Allowance Dated Aug. 30, 2011; U.S. Appl. No. 11/523,950.
Glasco et al., Notice of Allowance Dated Nov. 14, 2011; U.S. Appl. No. 11/523,950.
Lingfeng Yaun, Notice of Allowance Dated Feb. 16, 2011; U.S. Appl. No. 11/586,826.
Lingfeng Yaun, Notice of Allowance Dated Jul. 26, 2011; U.S. Appl. No. 11/586,826.
Lingfeng Yaun, Notice of Allowance Dated Dec. 27, 2011; U.S. Appl. No. 11/586,826.
Lingfeng Yaun, Notice of Allowance Dated Jul. 5, 2012; U.S. Appl. No. 11/586,826.
Van Dyke et al., Notice of Allowance Dated Apr. 19, 2011; U.S. Appl. No. 11/592,819.
Van Dyke et al., Notice of Allowance Dated Sep. 7, 2011; U.S. Appl. No. 11/592,819.
Glasco et al., Notice of Allowance Dated Dec. 8, 2011; U.S. Appl. No. 11/586,825.
Van Dyke et al., Notice of Allowance Dated Dec. 9, 2011; U.S. Appl. No. 11/592,819.
Van Dyke et al., Notice of Allowance Dated Jun. 7, 2012; U.S. Appl. No. 11/592,819.
Van Dyke et al., Notice of Allowance Dated Oct. 5, 2012; U.S. Appl. No. 11/592,819.
Glasco et al., Office Action Dated Sep. 14, 2012; U.S. Appl. No. 11/591,629.
Glasco et al., Final Office Action Dated Apr. 12, 2011; U.S. Appl. No. 11/592,780.
Glasco et al., Office Action Dated Nov. 1, 2011; U.S. Appl. No. 11/592,780.
Glasco et al., Final Office Action Dated May 7, 2012; U.S. Appl. No. 11/592,780.
Lingfeng Yaun, Notice of Allowance Dated Jun. 17, 2011; U.S. Appl. No. 11/591,856.
Lingfeng Yaun, Notice of Allowance Dated Sep. 26, 2011; U.S. Appl. No. 11/591,856.
Lingfeng Yaun, Notice of Allowance Dated Jan. 5, 2012; U.S. Appl. No. 11/591,856.
Lingfeng Yaun, Notice of Allowance Dated Apr. 12, 2012; U.S. Appl. No. 11/591,856.
Lingfeng Yaun, Notice of Allowance Dated Jun. 7, 2012; U.S. Appl. No. 11/591,856.
Lingfeng Yaun, Notice of Allowance Dated Sep. 17, 2012; U.S. Appl. No. 11/591,856.
Glasco et al., Notice of Allowance Dated Jun. 16, 2011; U.S. Appl. No. 11/586,825.

(56) References Cited

OTHER PUBLICATIONS

Glasco et al., Notice of Allowance Dated Aug. 9, 2011; U.S. Appl. No. 11/586,825.
Harper et al., (Rapid recovery from transient Faults in the fault tolerant processor with fault-tolerant shared memory) 1990, IEEE, pp. 350-359.
Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
PCMAG (Definition of: Page fault) www.Pcmag.com, 1 Page; Mar. 2009.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. of Tech. 1-118.
Glasco et al., Notice of Allowance Dated Jul. 6, 2012; U.S. Appl. No. 11/586,825.
Glasco et al., Notice of Allowance Dated Oct. 12, 2012: U.S. Appl. No. 11/586,825.
Glasco et al., Office Action Dated May 6, 2011; U.S. Appl. No. 11/591,685.
Glasco et al., Final Office Action Dated Nov. 16, 2011; U.S. Appl. No. 11/591,685.
Glasco et al., Notice of Allowance Dated Feb. 22, 2012: U.S. Appl. No. 11/591,685.
Glasco et al., Notice of Allowance Dated May 30, 2012: U.S. Appl. No. 11/591,685.
Glasco et al., Notice of Allowance Dated Sep. 26, 2012: U.S. Appl. No. 11/591,685.
Glasco et al., Notice of Allowance Dated Aug. 29, 2012: U.S. Appl. No. 11/523,830.
Glasco et al., Notice of Allowance Dated Nov. 20, 2012: U.S. Appl. No. 11/588,177.
Glasco et al., Notice of Allowance Dated Mar. 21, 2012: U.S. Appl. No. 11/586,825.
Glasco, et al; Office Action Dated Apr. 27, 2009; U.S. Appl. No. 11/591,685; All Pages.
Glasco, et al; Office Action Dated Nov. 20, 2009; U.S. Appl. No. 11/591,685; All Pages.
Glasco, et al; Office Action Dated May 11, 2010; U.S. Appl. No. 11/591,685; All Pages.
Glasco, et al; Final Office Action Dated Oct. 27, 2010; U.S. Appl. No. 11/591,685; All Pages.
Glasco, et al; Notice of Allowance Dated Jan. 14, 2013; U.S. Appl. No. 11/591,685; All Pages.
Glasco, et al; Election/Restriction Dated Apr. 28, 2009; U.S. Appl. No. 11/592,076; All Pages.
Glasco, et al; Office Action Dated Aug. 19, 2009; U.S. Appl. No. 11/592,076; All Pages.
Glasco, et al; Notice of Allowance Dated Jan. 29, 2010; U.S. Appl. No. 11/592,076; All Pages.
Glasco, et al; Notice of Allowance Dated May 4, 2010; U.S. Appl. No. 11/592,076; All Pages.
Glasco, et al; Notice of Allowance Dated Aug. 13, 2010; U.S. Appl. No. 11/592,076; All Pages.
Glasco, et al; Notice of Allowance Dated Nov. 26, 2010; U.S. Appl. No. 11/592,076; All Pages.
Glasco, et al; Notice of Allowance Dated Aug. 16, 2012; U.S. Appl. No. 11/592,076; All Pages.
Glasco, et al; Election/Restriction Dated Aug. 10, 2010; U.S. Appl. No. 12/650,068; All Pages.
Glasco, et al; Notice of Allowance Dated Sep. 17, 2012; U.S. Appl. No. 12/650,068; All Pages.
Glasco, et al; Notice of Allowance Dated Jan. 28, 2013; U.S. Appl. No. 12/650,068; All Pages.
Glasco, et al; Office Action Dated Sep. 15, 2008; U.S. Appl. No. 11/523,830; All Pages.
Glasco, et al; Office Action Dated May 28, 2009; U.S. Appl. No. 11/523,830; All Pages.
Glasco, et al; Final Office Action Dated Mar. 16, 2010; U.S. Appl. No. 11/523,830; All Pages.
Glasco, et al; Notice of Allowance Dated Jun. 28, 2010; U.S. Appl. No. 11/523,830; All Pages.
Glasco, et al; Notice of Allowance Dated Sep. 2, 2010; U.S. Appl. No. 11/523,830; All Pages.
Glasco, et al; Notice of Allowance Dated Jan. 20, 2011; U.S. Appl. No. 11/523,830; All Pages.
Glasco, et al; Notice of Allowance Dated May 5, 2011; U.S. Appl. No. 11/523,830; All Pages.
Glasco, et al; Office Action Dated Nov. 18, 2008; U.S. Appl. No. 11/586,756; All Pages.
Glasco, et al; Final Office Action Dated Jun. 4, 2009; U.S. Appl. No. 11/586,756; All Pages.
Glasco, et al; Office Action Dated Jan. 20, 2010; U.S. Appl. No. 11/586,756; All Pages.
Glasco, et al; Final Office Action Dated Aug. 3, 2010; U.S. Appl. No. 11/586,756; All Pages.
Glasco, et al; Notice of Allowance Dated Dec. 27, 2010; U.S. Appl. No. 11/586,756; All Pages.
Glasco, et al; Notice of Allowance Dated May 12, 2011; U.S. Appl. No. 11/586,756; All Pages.
Glasco, et al; Notice of Allowance Dated Feb. 20, 2013; U.S. Appl. No. 11/586,756; All Pages.
Glasco, et al; Election/Restriction Dated Apr. 27, 2009; U.S. Appl. No. 11/591,857; All Pages.
Glasco, et al; Office Action Dated Aug. 19, 2009; U.S. Appl. No. 11/591,857; All Pages.
Glasco, et al; Office Action Dated Dec. 7, 2010; U.S. Appl. No. 11/591,857; All Pages.
Glasco, et al; Notice of Allowance Dated Mar. 18, 2011; U.S. Appl. No. 11/591,857; All Pages.
Glasco, et al; Notice of Allowance Dated Dec. 31, 2012; U.S. Appl. No. 11/591,857; All Pages.
Glasco, et al; Notice of Allowance Dated Feb. 1, 2013; U.S. Appl. No. 11/591,857; All Pages.
Glasco, et al; Office Action Dated Apr. 1, 2009; U.S. Appl. No. 11/592,106; All Pages.
Glasco, et al; Final Office Action Dated Nov. 23, 2009; U.S. Appl. No. 11/592,106; All Pages.
Glasco, et al; Final Office Action Dated Jun. 25, 2010; U.S. Appl. No. 11/592,106; All Pages.
Glasco, et al; Office Action Dated Dec. 16, 2010; U.S. Appl. No. 11/592,106; All Pages.
Glasco, et al; Office Action Dated Jan. 3, 2013; U.S. Appl. No. 11/592,106; All Pages.
Glasco, et al; Office Action Dated Sep. 15. 2008; U.S. Appl. No. 11/523,926; All Pages.
Glasco, et al; Final Office Action Dated Apr. 10, 2009; U.S. Appl. No. 11/523,926; All Pages.
Glasco, et al; Office Action Dated Oct. 1, 2009; U.S. Appl. No. 11/523,926; All Pages.
Glasco, et al; Notice of Allowance Dated Mar. 29, 2010; U.S. Appl. No. 11/523,926; All Pages.
Glasco, et al; Notice of Allowance Dated Jul. 9, 2010; U.S. Appl. No. 11/523,926; All Pages.
Glasco, et al; Notice of Allowance Dated Oct. 27, 2010; U.S. Appl. No. 11/523,926; All Pages.
Glasco, et al; Office Action Dated Oct. 29, 2008; U.S. Appl. No. 11/523,950; All Pages.
Glasco, et al; Notice of Allowance Dated Apr. 24, 2009; U.S. Appl. No. 11/523,950; All Pages.
Glasco, et al; Notice of Allowance Dated Sep. 3, 2009; U.S. Appl. No. 11/523,950; All Pages.
Glasco, et al; Notice of Allowance Dated Dec. 24, 2009; U.S. Appl. No. 11/523,950; All Pages.
Glasco, et al; Notice of Allowance Dated Jul. 21, 2010; U.S. Appl. No. 11/523,950; All Pages.
Glasco, et al; Notice of Allowance Dated Nov. 3, 2009; U.S. Appl. No. 11/523,950; All Pages.
Glasco, et al; Notice of Allowance Dated Apr. 2, 2013; U.S. Appl. No. 11/523,950; All Pages.

(56) References Cited

OTHER PUBLICATIONS

Lingfeng Yuan; Office Action Dated Dec. 16, 2008; U.S. Appl. No. 11/586,826; All Pages.
Lingfeng Yuan; Notice of Allowance Dated Jun. 22, 2009; U.S. Appl. No. 11/586,826; All Pages.
Lingfeng Yuan; Notice of Allowance Dated Dec. 14, 2009; U.S. Appl. No. 11/586,826; All Pages.
Lingfeng Yuan; Notice of Allowance Dated Feb. 7, 2013; U.S. Appl. No. 11/586,826; All Pages.
Van Dyke, et al.; Office Action Dated Feb. 17, 2009; U.S. Appl. No. 11/592,819; All Pages.
Van Dyke, et al.; Notice of Allowance Dated Oct. 16, 2009; U.S. Appl. No. 11/592,819; All Pages.
Van Dyke, et al.; Office Action Dated Mar. 17, 2010; U.S. Appl. No. 11/592,819; All Pages.
Van Dyke, et al.; Notice of Allowance Dated Nov. 23, 2010; U.S. Appl. No. 11/592,819; All Pages.
Van Dyke, et al.; Notice of Allowance Dated Jan. 24, 2013; U.S. Appl. No. 11/592,819; All Pages.
Glasco, et al.; Office Action Dated Feb. 20, 2009; U.S. Appl. No. 11/591,629; All Pages.
Glasco, et al.; Final Office Action Dated Nov. 9, 2009; U.S. Appl. No. 11/591,629; All Pages.
Glasco, et al.; Office Action Dated May 27, 2010; U.S. Appl. No. 11/591,629; All Pages.
Glasco, et al.; Office Action Dated Nov. 3, 2010; U.S. Appl. No. 11/591,629; All Pages.
Glasco, et al.; Final Office Action Dated Jun. 8, 2011; U.S. Appl. No. 11/591,629; All Pages.
Glasco, et al.; Notice of Allowance Dated Mar. 7, 2013; U.S. Appl. No. 11/591,629; All Pages.
Glasco, et al.; Office Action Dated Apr. 2, 2009; U.S. Appl. No. 11/592,780; All Pages.
Glasco, et al.; Final Office Action Dated Nov. 24, 2009; U.S. Appl. No. 11/592,780; All Pages.
Glasco, et al.; Office Action Dated Apr. 28, 2010; U.S. Appl. No. 11/592,780; All Pages.
Glasco, et al.; Office Action Dated Oct. 13, 2010; U.S. Appl. No. 11/592,780; All Pages.
Lingfeng Yuan; Office Action Dated May 11, 2009; U.S. Appl. No. 11/591,856; All Pages.
Lingfeng Yuan; Final Office Action Dated Dec. 8, 2009; 11/591,856; All Pages.
Lingfeng Yuan; Office Action Dated Apr. 27, 2010; U.S. Appl. No. 11/591,856; All Pages.
Lingfeng Yuan; Notice of Allowance Dated Nov. 12, 2010; 11/591,856; All Pages.
Lingfeng Yuan; Notice of Allowance Dated Mar. 09, 2011; U.S. Appl. No. 11/591,856; All Pages.
Lingfeng Yuan; Notice of Allowance Dated Jan. 17, 2013; U.S. Appl. No. 11/591,856; All Pages.
Glasco, et al.; Office Action Dated Mar. 18, 2009; U.S. Appl. No. 11/586,825; All Pages.
Glasco, et al.; Final Office Action Dated Oct. 14, 2009; U.S. Appl. No. 11/586,825; All Pages.
Glasco, et al.; Office Action Dated Feb. 22, 2010; U.S. Appl. No. 11/586,825; All Pages.
Glasco, et al.; Notice of Allowance Dated Aug. 16, 2010; U.S. Appl. No. 11/586,825; All Pages.
Glasco, et al.; Notice of Allowance Dated Nov. 26, 2010; U.S. Appl. No. 11/586,825; All Pages.
Glasco, et al.; Notice of Allowance Dated Mar. 4, 2011; U.S. Appl. No. 11/586,825; All Pages.
Glasco, et al. Notice of Allowance dated May 8, 2013, U.S. Appl. No. 11/591,685; All Pages.
Glasco, et al. Notice of Allowance dated May 10, 2013, U.S. Appl. No. 12/650,068; Publication No. 2010-0106921A1; Publication Date: Apr. 29, 2010; All Pages.
Glasco, et al. Notice of Allowance dated May 23, 2013, U.S. Appl. No. 11/591,857; All Pages.
Glasco, et al. Final Office Action dated Jun. 6, 2013, U.S. Appl. No. 11/592,106; All Pages.
Glasco, et al. Notice of Allowance dated May 16, 2013, U.S. Appl. No. 11/523,950; All Pages.
Van Dyke, et al. Notice of Allowance dated May 8, 2013, U.S. Appl. No. 11/592,819; All Pages.
Yuan, et al. Notice of Allowance dated Apr. 30, 2013, U.S. Appl. No. 11/591,856; All Pages.
Notice of Allowance dated Aug. 1, 2013; U.S. Appl. No. 11/591,685; Inventor: Glasco, D.; Application Filed Nov. 1, 2006.
Notice of Allowance dated Jul. 18, 2013; U.S. Appl. No. 11/586,756; Inventor: Glasco, D.; Application Filed Oct. 24, 2006.
Office Action dated Oct. 3, 2013; U.S. Appl. No. 11/592,106; Inventor: Glasco, D.; Application Filed Nov. 1, 2006.
Notice of Allowance dated Aug. 26, 2013; U.S. Appl. No. 11/586,826; Inventor: Yuan, L; Application Filed Nov. 24, 2006.
Notice of Allowance dated Aug. 1, 2013; U.S. Appl. No. 11/592,819; Inventor: Van Dyke, J.; Application Filed Nov. 1, 2006.
Notice of Allowance dated Jul. 30, 2013; U.S. Appl. No. 11/591,629; Inventor: Glasco, D.; Application Filed Nov. 1, 2006.
Office Action dated Sep. 10, 2013; U.S. Appl. No. 11/592,780; Inventor: Glasco, D.; Application Filed Nov. 3, 2006.
Notice of Allowance Dated Jul. 29, 2013; U.S. Appl. No. 12/650,068.

* cited by examiner

US 8,707,011 B1

MEMORY ACCESS TECHNIQUES UTILIZING A SET-ASSOCIATIVE TRANSLATION LOOKASIDE BUFFER

BACKGROUND OF THE INVENTION

Computing devices have made significant contributions toward the advancement of modern society and are utilized in a number of applications to achieve advantageous results. Numerous devices, such as personal computers, servers, hand-held devices, distributed computer systems, calculators, audio devices, video equipment, and telephone systems, have facilitated increased productivity and reduced costs in analyzing and communicating data in most areas of business, science, education and entertainment.

Computing device-readable memory is usually an important component of a number of computing devices. Computing device-readable memories typically store information utilized by a system in performance of a number of different tasks. Other components of a system typically request access to memory in order to retrieve (e.g., "read") information from and store (e.g., "write") information in the memory. Different types of memories (e.g., mass storage, main memory, removable memory and the like) and/or memory "spaces" (e.g., virtual, physical) can be utilized to support information storage.

Different types of computing device-readable memory can potentially offer different features, such as storage capacity and access speed. Traditionally, memories that have relatively large storage capacity have relatively slow access speeds. Memories that have relatively fast access speeds, in contrast, typically have relatively small storage capacities. For example, primary memories (e.g., main memory) are relatively fast compared to secondary memories (e.g., mass storage memory) but typically store less information. In view of the tradeoffs a number of systems transfer chunks of information between relatively fast small memories and relatively slow bulk memories to attempt to optimize speed and capacity. As a result, the system may virtualize the physical memory to give each application the view that they have a large contiguous memory. The memory management unit (MMU) manages the mappings that virtualize the memory space.

Another technique for optimizing performance in computing devices is to utilize virtual and physical address spaces. Virtual address space allows applications to utilize as much memory as needed without regard to the true size of physical memory or the memory utilization of other applications. The application retrieves and stores instructions and data utilizing virtual addresses, and the memory system retrieves and stores instruction and data in physical memory using physical addresses to access the true physical memory. Accordingly, translation between the virtual memory space addressing and physical memory space addressing is performed by the computing system. As a result, applications and data may be moved within memory and between different types of memory without having to recode applications.

Although the above techniques are currently utilized, the continued advancement of computing devices results in a continuous need for ever increasing memory system performance. Therefore, there is a continuing need for memory management techniques that provide additional optimization.

SUMMARY OF THE INVENTION

Embodiments of the present invention are directed toward memory access techniques that include support for a plurality of page sizes. In one embodiment, a computing device includes a processor, memory and a memory management unit. The memory includes a first portion of an address translation data structure, such as one or more page directories and a plurality of page tables. The memory management unit includes a cache containing a second portion of the address translation data structure. The second portion of the address translation data structure includes a page size table and a set-associative translation lookaside buffer. The memory management unit is adapted to determine a set index for accessing the translation lookaside buffer utilizing a given entry in the page size table.

In another embodiment, a method of accessing memory includes receiving a memory access request. A set index is determined from a page size table utilizing a virtual address of the memory access request. A set-associative translation lookaside buffer is accessed utilizing the set index to determine the mapping of the virtual address to a physical address.

In yet another embodiment, a memory management method begins with receipt of a memory access request. A page size table lookup is performed to determine a page size of the memory access request. A set index is calculated utilizing the page size. The set index is utilized to retrieve a given set of entries in a translation lookaside buffer. It is determining if the given set of entries contains an entry that is a match for the virtual address. If the given entry is a match for the virtual address, the physical address is contained in the data portion of the given entry. The physical address may then be utilized to access a computing device-readable medium. In addition, the method may also include translating the virtual address to a physical address utilizing a page directory and a given page table if the given set of entries does not contain a match for the virtual address. The mapping resulting from the translation may be cached as a particular translation lookaside buffer entry and the page size may be cached in a corresponding page size table entry.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
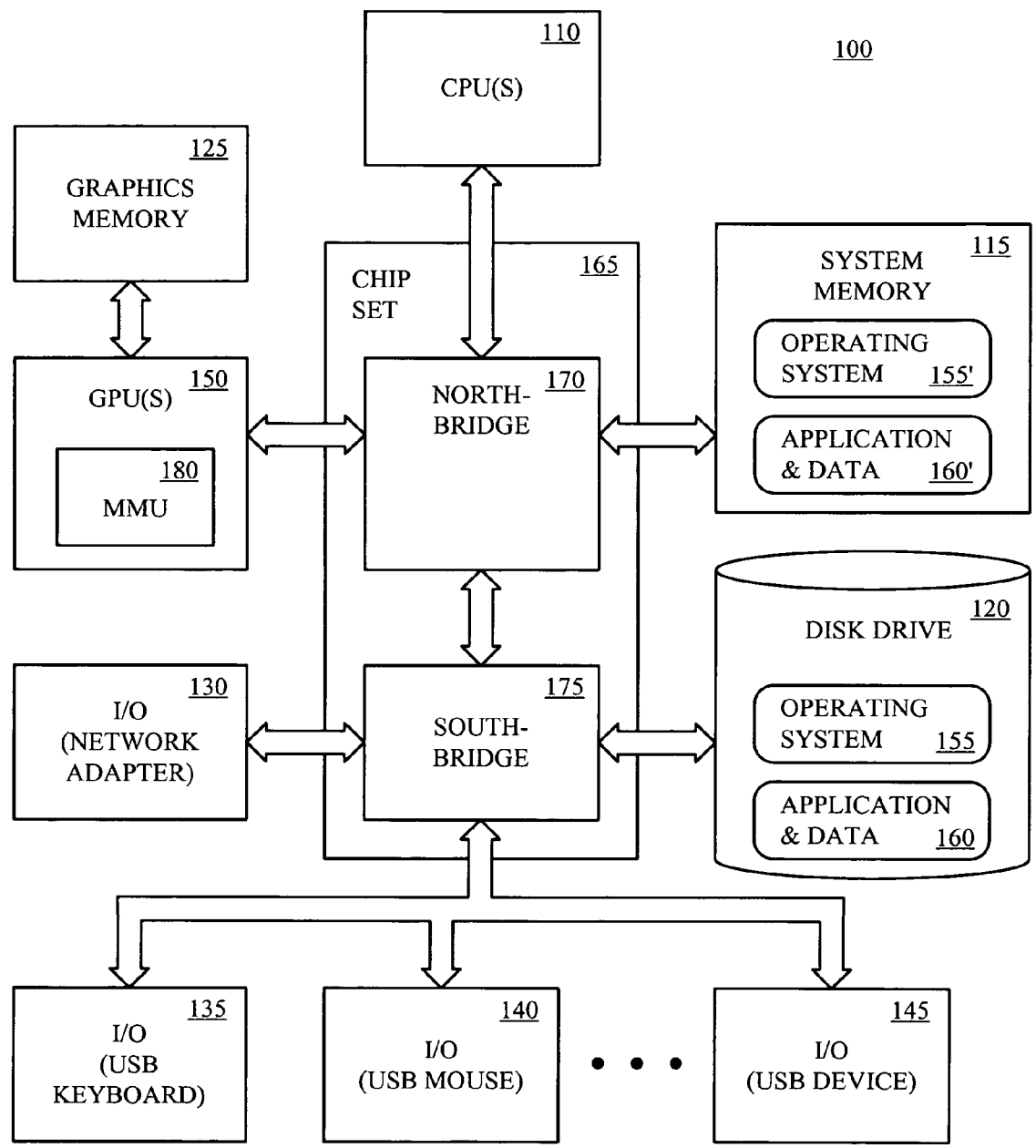
FIG. 1 shows a block diagram of an exemplary computing device 100 for implementing embodiments of the present invention.

Referring to FIG. 1, an exemplary computing device 100 for implementing embodiments of the present invention is shown. The computing device 100 may be a personal computer, server computer, client computer, laptop computer, hand-held device, minicomputer, mainframe computer, distributed computer system or the like. The computing device 100 includes one or more processors (e.g., CPU) 110, one or more computing device-readable medium 115, 120, 125 and one or more input/output (I/O) devices 120, 130, 135, 140, 145. The I/O device 130, 135, 140, 145 may include a network adapter (e.g., Ethernet card), CD drive, DVD drive and/or the like, and peripherals such as a keyboard, a pointing device, a speaker, a printer, and/or the like. The computing device 100 may also include one or more specialized processors, such as a graphics processing unit (GPU) 150.

The computing device-readable media 115, 120, 125 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 155 and applications and data 160. The primary memory, such as the system memory 115 and/or graphics memory 125, provides for volatile storage of computer-readable instructions and data for use by the computing device 100. For instance, the system memory 115 may temporarily store a portion of the operating system 155' and a portion of one or more applications and associated data 160' that are currently used by the CPU 110, GPU 150 and the like.

The computing device-readable media 115, 120, 125, I/O devices 120, 130, 135, 140, 145, and GPU 150 may be communicatively coupled to the processor 110 by a chip set 165 and one or more busses. The chipset 165 acts as a simple input/output hub for communicating data and instructions between the processor 110 and the computing device-readable media 115, 120, 125, I/O devices 120, 130, 135, 140, 145, and GPU 150. In one implementation, the chipset 165 includes a northbridge 170 and southbridge 175. The northbridge 170 provides for communication with the processor 110 and interaction with the system memory 115. The southbridge 175 provides for input/output functions.

The graphic processing unit 150 may include a memory management unit (MMU) 180 for managing the transfer of data and instructions. However, in other embodiments the MMU 180 may be an independent circuit, a part of the chip set 165, a part of the primary or secondary memory, and/or other element in the computing device. One management function of the MMU 180 includes support for multiple page sizes. In particular, multiple page sizes may be allowed by the MMU 180 in the GPU 150 in order to maintain compatibility with the CPU 110.

Figure 2:
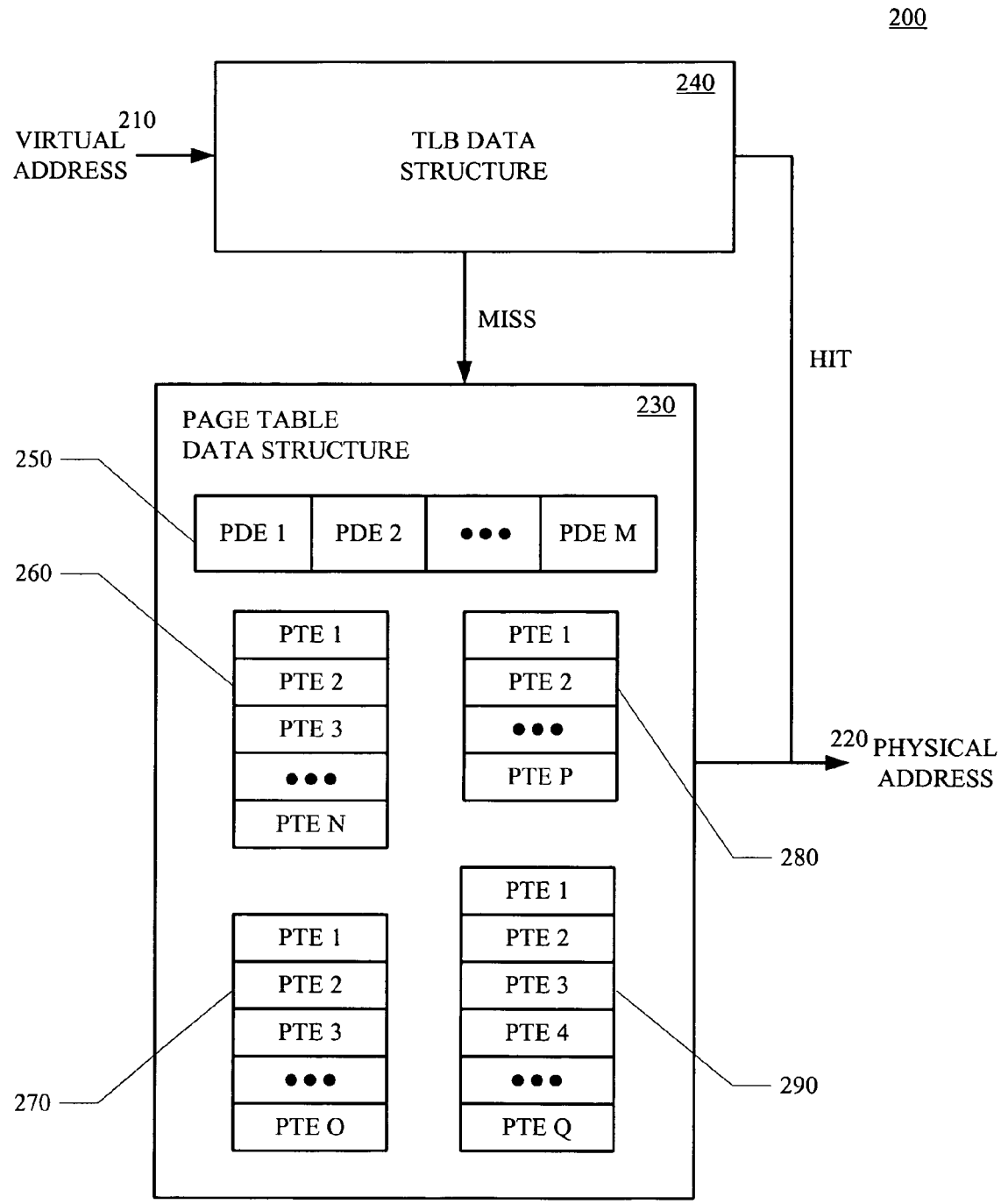
FIG. 2 shows a block diagram of an address translation data structure, in accordance with one embodiment of the present invention.

The MMU 180 translates virtual addresses to physical addresses using an address translation data structure. Referring to FIG. 2, an address translation data structure, in accordance with one embodiment of the present invention, is shown. The address translation data structure may include a page table data structure 230 and a translation lookaside buffer (TLB) data structure 240. The page table data structure 230 may include a page directory 250 and one or more page tables 260-290. The page directory 250 includes a plurality of page directory entries (PDE). Each PDE includes the address of a corresponding page table 260-290. Each PDE may also include one or more parameters. Each page table 260-290 includes one or more page table entries (PTE). Each PTE includes a corresponding physical address of data and/or instructions in primary or secondary memory. Each PTE may also include one or more parameters.

Figure 3:
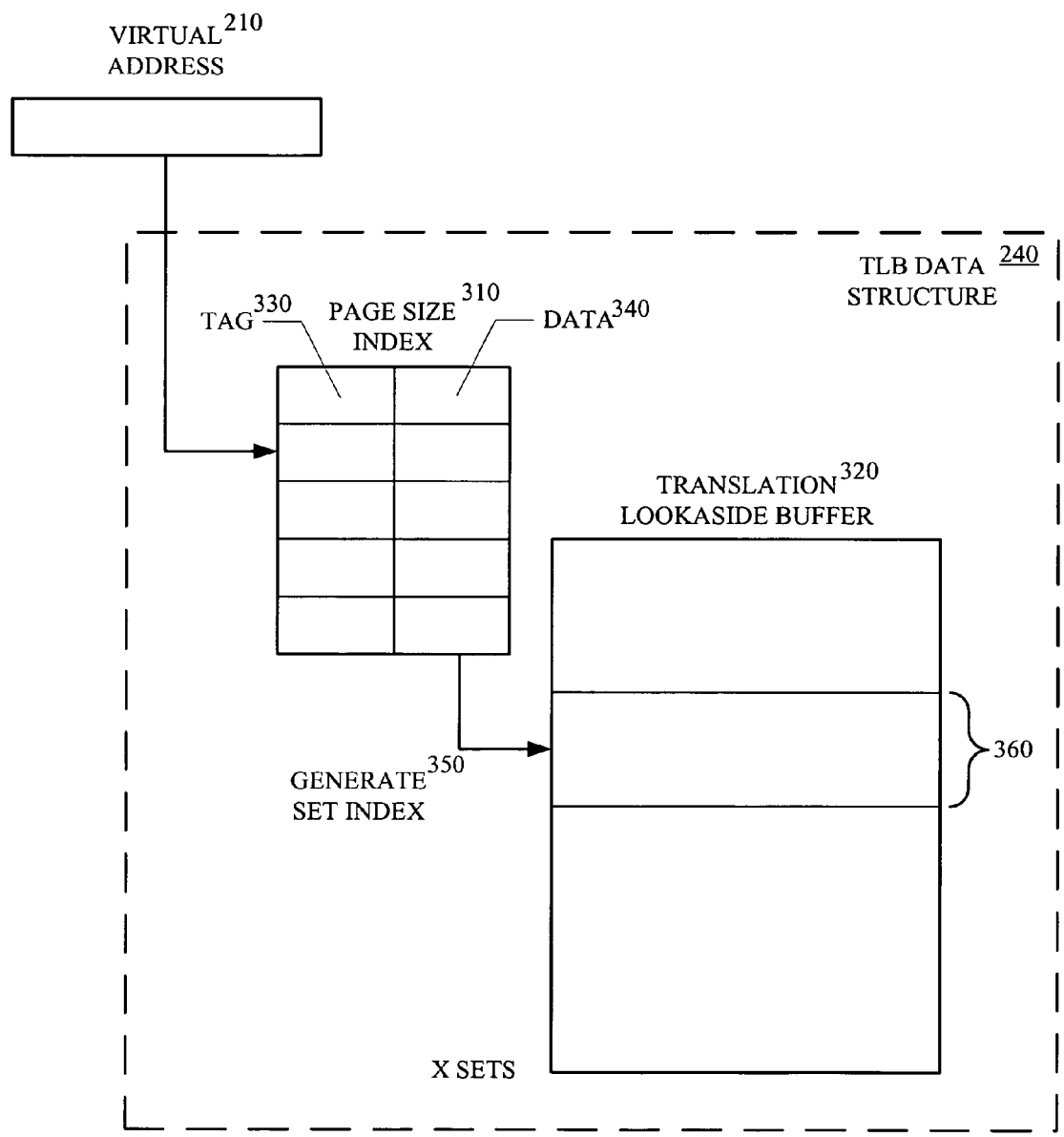
FIG. 3 shows a block diagram of a TLB data structure, in accordance with one embodiment of the present invention.

Upon receiving a virtual address, the TLB data structure 240 is accessed to determine if a mapping between the virtual address 210 and the physical address 220 has been cached. Referring now to FIG. 3, a TLB data structure, in accordance with one embodiment of the present invention, is shown. As depicted in FIG. 3, the TLB data structure 240 includes a page size index table 310 and a translation lookaside buffer 320. The translation lookaside buffer 320 includes a plurality of TLB entries arranged as set associated data structure. In particular, the plurality of TLB entries are divided into multiple sets of TLB entries (e.g., x sets, wherein each set includes $2^n$ entries).

The set index is determined as a function of a parameter in the memory access request. In one embodiment the set index is a function of the page size. The pages in the page table, pointed to by a given page directory, have the same size. Thus, a PTE pointed to by a given PDE maps a fixed page size. Therefore the page size becomes a property of the PDE. Utilizing the page size to index set-associative TLB reduces the performance penalty caused by cache inefficiencies such as cache collisions.

Figure 4:
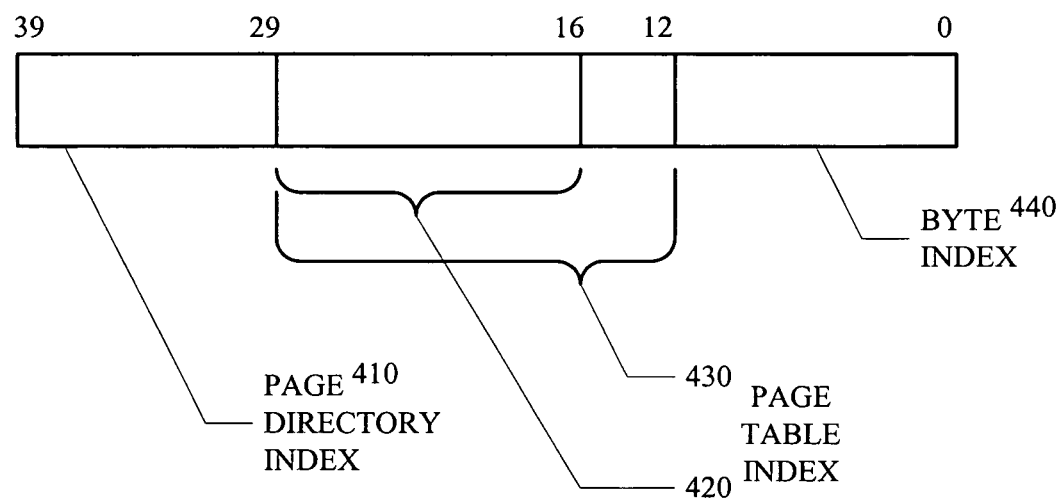
FIG. 4 shows a block diagram of a virtual address, in accordance with one embodiment of the present invention.

Upon receipt of a virtual address 210, the page size is looked-up in the page size table 310. More specifically, the tag 300 portion of each entry in the page size index 310 may contain a page directory index portion of a particular virtual address. Referring now to FIG. 4, the virtual address, in accordance with one embodiment of the present invention, is shown. The virtual address 210 includes a first set of bits that specify the page directory index 410, a second set of bits that specify the page table index 420, 430 and a third set of bits that specify the byte index 440. In one implementation, the page directory index 410 may be specified by bits 29-39 of the virtual address. If the page size is 64 Kbytes, the page table index 420 may be specified by bits 16-28. If the page size is 4 Kbytes, the page table index 430 may be specified by bits 12-28. The byte index 440 may be specified by the remaining low order bits.

Referring again to FIG. 3, the data 340 portion of each entry in the page size index table 310 contains the page size for the corresponding particular virtual address 210. The received virtual address 210 is compared to all of the entries in the page size index 310. If there is no entry in which the tag 330 portion matches the page directory index portion of the virtual address 210 then a page size cache miss is incurred and the virtual address 210 is translated to a physical address 220 utilizing the page table data structure as described in more detail below.

If a tag 330 portion of an entry in the page size index 310 matches the page directory index portion of the virtual address 210 then a page size cache hit is incurred. The data portion 340, of the given entry, that contains the page size is utilized to generate a set index 350. In one implementation the page size is encoded utilizing one or two bits. Furthermore, in order to reduce the tags portion of the cache, the allowed page size within large blocks of the address space may be restricted so that the tags are shorter and fewer entries in the page size table are needed.

The given set 360 in the translation lookaside buffer 320 is looked-up utilizing the set index 350. In one implementation, all of the TLB entries in the given set 360 are retrieved. The page directory index is compared against the tag portion of each TLB entry. If a match between the virtual address 210 and a given TLB entry in the given set 360 is determined, the data portion of the given TLB entry contains the physical address 220. Referring again to FIG. 2, if a valid mapping has been cached (e.g., TLB hit), the physical address 220 is output from the TLB data structure 240.

If a valid mapping is not cached in the TLB data structure 240, the page table data structure is walked to translate the virtual address 210 to a physical address 220. The page directory index in the virtual address 210 is used to index the page directory 250 to obtain the address of an appropriate page table 270. The page table index in the virtual address 210 is used to index the appropriate page table specified in the given PDE to obtain the physical address 220 of the page containing the data. The byte index in the virtual address 210 is then used to index the physical page to access the actual data. The resulting mapping is then typically cached in the TLB data structure 240 for use in translating subsequent memory access requests. In addition, a bit in the virtual address 210 that indicates the page size is cached as a data portion of a particular page size entry and the page directory index portion of the virtual address is cached as the corresponding tag portion of the particular page size entry.

Figure 5A:
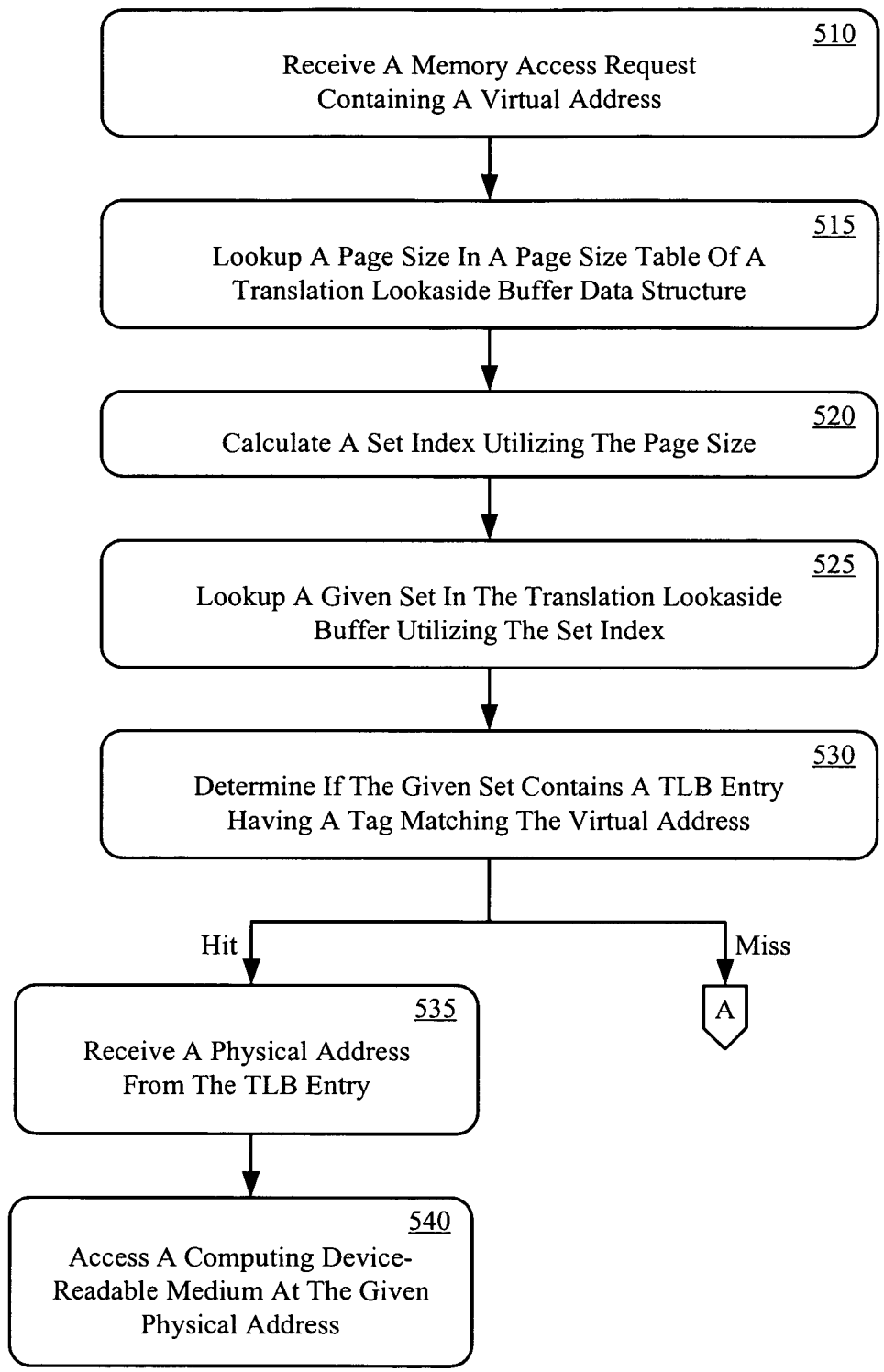
FIGS. 5A and 5B show a flow diagram of a method of translating a virtual address to a physical address, in accordance with one embodiment of the present invention.
Figure 5B:
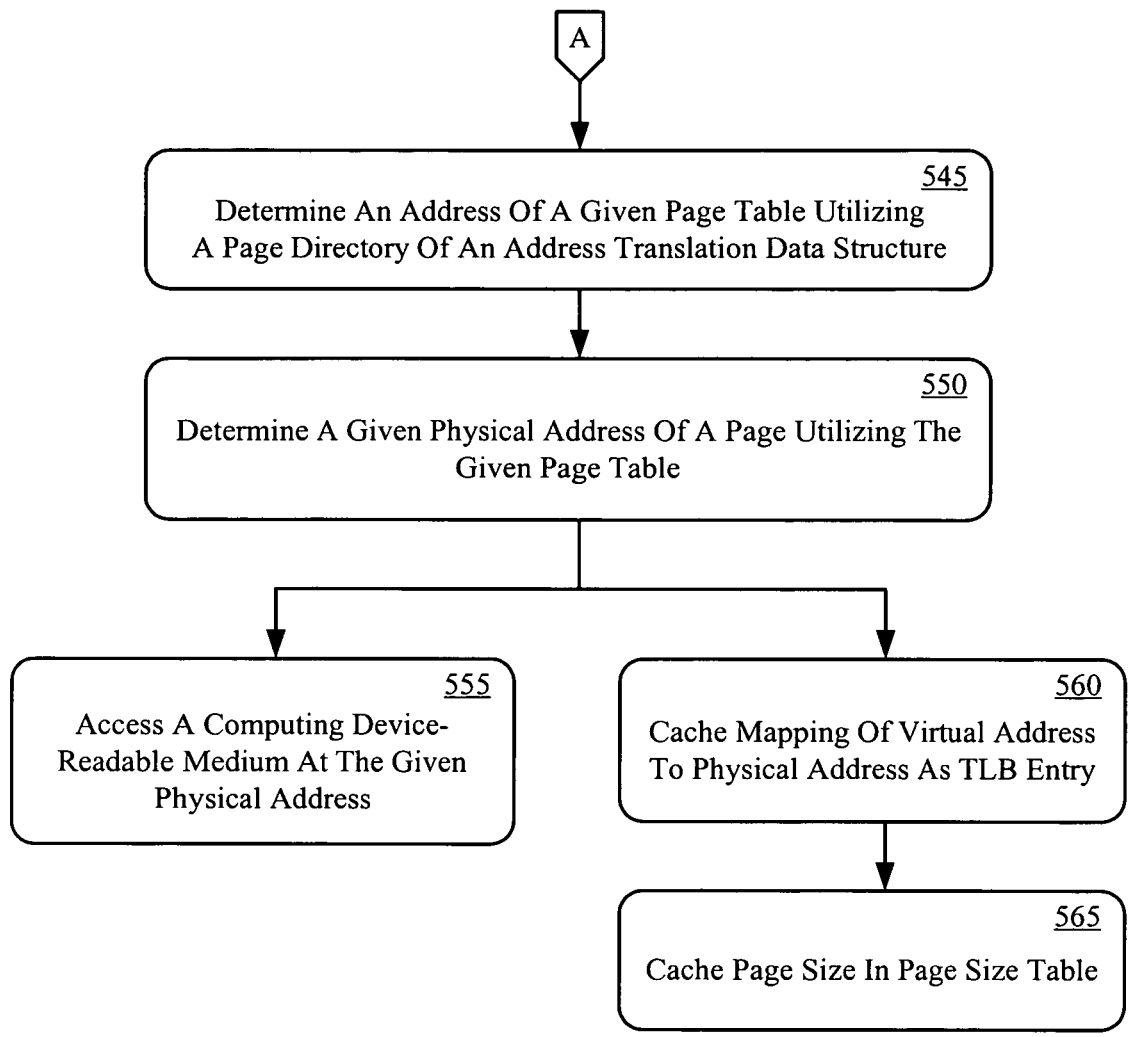

Referring now to FIGS. 5A and 5B, a method of translating a virtual address to a physical address, in accordance with one embodiment of the present invention, is shown. The method begins with receipt of a memory access request, at 510. A page directory portion of a virtual address for the memory access request is utilized to lookup a page size in a page size table of a translation lookaside buffer data structure, at 515. If the page size table does not contain a matching entry, the method proceeds to the process at 545.

At 520, a set index is calculated utilizing a page size encoded in the given entry in the page size table matching the page directory entry portion of the virtual address. The set index is utilized to lookup a given set of TLB entries in a translation lookaside buffer, at 525. At 530, it is determined if the given set contains a TLB entry having a tag matching the virtual address. If a particular given TLB entry in the set is a match for the virtual address, the given physical address is received from the given TLB entry, at 535. A computing device-readable medium may then be accessed at the given physical address, at 540.

If there is no TLB entry in the set that is a match for the virtual address, the address of a given page table is determined, utilizing the page directory index portion of the virtual address, from a page table of an address translation data structure, at 545. At 550, the given physical address is determined, utilizing a page table index portion of the virtual address, from the given page table. The computing device-readable medium may then be accessed at the given physical address, at 555. In addition, the mapping of the virtual address to the physical address, determined from the processes at 545 and 550, may be cached as a particular TLB entry in the translation lookaside buffer, at 560. At 565, the page size encoded in the virtual address may be cached in the page size table of the translation lookaside buffer data structure.

The page size cache advantageously solves the problem of supporting multiple page sizes while utilizing a set associated translation lookaside buffer. The page size table caches the page size information in front of the main TLB cache so efficient TLB set indexes can be generated. The page size may be cached in the page size table utilizing one or two bits. In addition, the tags portion of the page size table may be reduced by restricting the allowed page size within large blocks in the address space so that the tags are shorter and fewer entries in the cache are needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A memory access system comprising:
   a processor;
   a first computing device-readable medium, communicatively coupled to the processor, and including a page table data structure including a page directory and one or more page tables, wherein the page directory includes addresses of the one or more page tables indexed by corresponding page directory index values; and
   a memory management unit, communicatively coupled to the first computing device-readable medium and the processor;
      wherein the memory management unit receives virtual addresses including a first set of bits that specify a page directory index, a second set of bit that specify a page table index, and a third set of bits that specify a byte index;
      wherein the memory management unit comprises a second computing device-readable medium including a translation lookaside buffer data structure; and
      wherein the translation lookaside buffer data structure comprises a set-associative translation lookaside buffer and a page size table;
         wherein the page size table includes a plurality of page directory index values to data including corresponding page size values; and
         wherein the set-associative translation lookaside buffer includes a plurality of mappings of virtual addresses to physical addresses arranged in one or more sets;
      wherein the memory management unit determines a given mapping in the page size table including a page directory index value matching the page directory index in a received virtual address, generates a set index utilizing the page size from the given mapping, retrieves the mappings of virtual addresses to physical address in the set corresponding to the generated set index, and compares the page directory index in the received virtual address to the retrieved mappings of virtual addresses to physical address to determine a physical address if a match between the page directory index in the received virtual address and a given retrieved mapping in the translation lookaside buffer is found.

2. The memory access system of claim 1, wherein the memory management unit is adapted to receive a memory access request and translate the virtual address for the memory access request to a physical address utilizing the page table data structure or the translation lookaside buffer data structure.

3. The memory access system of claim 2, wherein the memory access request comprises a read operation.

4. The memory access system of claim 2, wherein the memory access request comprises a write operation.

5. The memory access system of claim 1, wherein:
the first computing device-readable medium is separate from the memory management unit; and
the second computing device-readable medium is on a chip that includes the memory management unit.

6. The memory access system of claim 1, wherein the second computing device-readable medium comprises a cache.

7. A method of accessing memory comprising:
receiving a memory access request including a virtual address comprising a first set of bits that specify a page directory index, a second set of bit that specify a page table index, and a third set of bits that specify a byte index;
accessing a page table data structure including a page directory and one or more page tables, wherein the page directory includes addresses of the one or more page tables indexed by corresponding page directory index values;
accessing a translation lookaside buffer data structure including a set-associative translation lookaside buffer and a page size table, wherein the page size table includes a plurality of page directory index values to data including corresponding page size values, and wherein the set-associative translation lookaside buffer includes a plurality of mappings of virtual addresses to physical addresses arranged in one or more sets determining a set index utilizing a page size determined from a given mapping in the page size table including a page directory index value matching the page directory index in the virtual address; and
accessing a given set of mappings in the set-associative translation lookaside buffer utilizing the set index; and
comparing the page directory index in the virtual address to the given set of accessed mappings to determine a physical address if a match between the page directory index in the virtual address and one of the given set of accessed mappings in the translation lookaside buffer is found;
determining an address of a given page table from the page directory utilizing the page directory entry index in virtual address; and
determining the physical address from the given page table utilizing the page table index in the virtual address.

8. The method according to claim 7, further comprising accessing a computing device-readable medium at the physical address.

9. The method according to claim 7, further comprising:
caching a mapping of the virtual address to the physical address determining from the page directory and the given page table as a particular translation lookaside buffer entry, if the given set of entries does not contain a match for the virtual address; and
caching a page size for the virtual address in the page size table.

10. The method according to claim 7, wherein the memory access request comprises a read operation.

11. The method according to claim 7, wherein the memory access request comprises a write operation.

* * * * *